(12) United States Patent
Moerdijk et al.

(10) Patent No.: US 7,246,349 B2
(45) Date of Patent: Jul. 17, 2007

(54) MIGRATION SUPPORT MECHANISM IN OPEN SERVICE AND OPEN MOBILE ARCHITECTURE

(75) Inventors: Ard-Jan Moerdijk, Breda (NL); Hans-Erik van Elburg, Oosterhout (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 561 days.

(21) Appl. No.: 10/232,479

(22) Filed: Aug. 28, 2002

(65) Prior Publication Data

US 2003/0061268 A1 Mar. 27, 2003

Related U.S. Application Data

(60) Provisional application No. 60/316,619, filed on Aug. 31, 2001.

(51) Int. Cl.
G06F 9/44 (2006.01)
H04M 3/42 (2006.01)

(52) U.S. Cl. .................................. 717/170; 455/414.1

(58) Field of Classification Search ................ 719/328, 719/311; 717/168–178, 120–122; 709/201–250; 370/465, 469; 455/432.5, 435, 3.01–3.06, 455/414, 456; 707/203; 718/106
See application file for complete search history.

(56) References Cited

U.S. PATENT DOCUMENTS 6,389,483 B1 * 5/2002 Larsson ..................... 719/313
6,415,435 B1 * 7/2002 McIntyre ................... 717/108
6,493,768 B1 * 12/2002 Boutcher .................... 719/330
6,580,916 B1 * 6/2003 Weisshaar et al. ........ 455/456.1
6,604,140 B1 * 8/2003 Beck et al. ................. 709/226
6,698,017 B1 * 2/2004 Adamovits et al. ......... 717/168
6,754,848 B1 * 6/2004 Froehlich et al. ............. 714/28
7,100,149 B1 * 8/2006 Venkatesan et al. ........ 717/121

FOREIGN PATENT DOCUMENTS

WO PCT/EP02/09652 3/2003

OTHER PUBLICATIONS

Stretch, R. M., "The OSA API and other Related Issues," *BT Technology Journal,* London, Great Britain, vol. 19, No. 1, Jan. 1, 2001, pp. 80-87, XP002206267.

* cited by examiner

*Primary Examiner*—William Thomson
*Assistant Examiner*—Charles E Anya
(74) *Attorney, Agent, or Firm*—Michael Cameron, Esq.

(57) ABSTRACT

A method for migrating between first and second service enablers in an open service architecture includes registering a second service enabler within open service architecture framework. The properties of the registered second service enabler are compared with the properties of at least one of first service enablers which determines if the second service is backward compatible to the first service enabler. Information concerning whether the second service enabler is backward compatible with the first service enabler is then forwarded to an application using the first service. Additional information that can be sent to the application in the same message includes, e.g., the fact that the second service enabler outdates a first one, a migration strategy and references to interfaces on the second service enabler that the application can already start using.

21 Claims, 3 Drawing Sheets

MIGRATION SUPPORT MECHANISM IN OPEN SERVICE AND OPEN MOBILE ARCHITECTURE

RELATED APPLICATION(S)

This application claims priority from and incorporates herein by reference the entire disclosure of U.S. Provisional Application Ser. No. 60/316,619 filed Aug. 31, 2001.

TECHNICAL FIELD

The present invention relates to the open service architecture, and more particularly, to a method for aiding applications in migrating from one service enabler to another service enabler in the open service architecture.

BACKGROUND OF THE INVENTION

In today's network, applications and services are a part of the network operator's domain and are built using intelligent network technology. This approach is excellent for simple mass-market applications, but with the emergence of mobility and the internet protocol, rapid deployment of innovative applications that combine different features and critical enterprise data becomes a challenge.

A number of industrial forums and standardization bodies, such as Parlay and 3GPP, have addressed this challenge and specified APIs (application program interfaces) that serve as an interface between the applications and core networks. The term Open Service Architecture refers to the set of APIs developed by Parlay, 3GPP and ETSI. Within the open service architecture, a basic mechanism exists to which an application within the OSA can subscribe to be notified when a new service capability feature (SCF) becomes available. However, this mechanism provides no indication as to what extent the new SCF is backward compatible with existing SCFs the application is presently using. Thus, there exists a need within the open service architecture for a mechanism for informing an application of the compatibility of new SCFs with existing SCFs.

SUMMARY OF THE INVENTION

The present invention overcomes the foregoing and other problems with a system and method for migrating between a first and second service in an open service architecture. A second service registers with an open service architecture framework and responsive thereto a comparison is made between the properties of the second service and the properties of the first service to determine if the second service is backward compatible with the first service. Information concerning whether the second service is backward compatible to the first service is forwarded to at least one application using the first service after the comparison

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
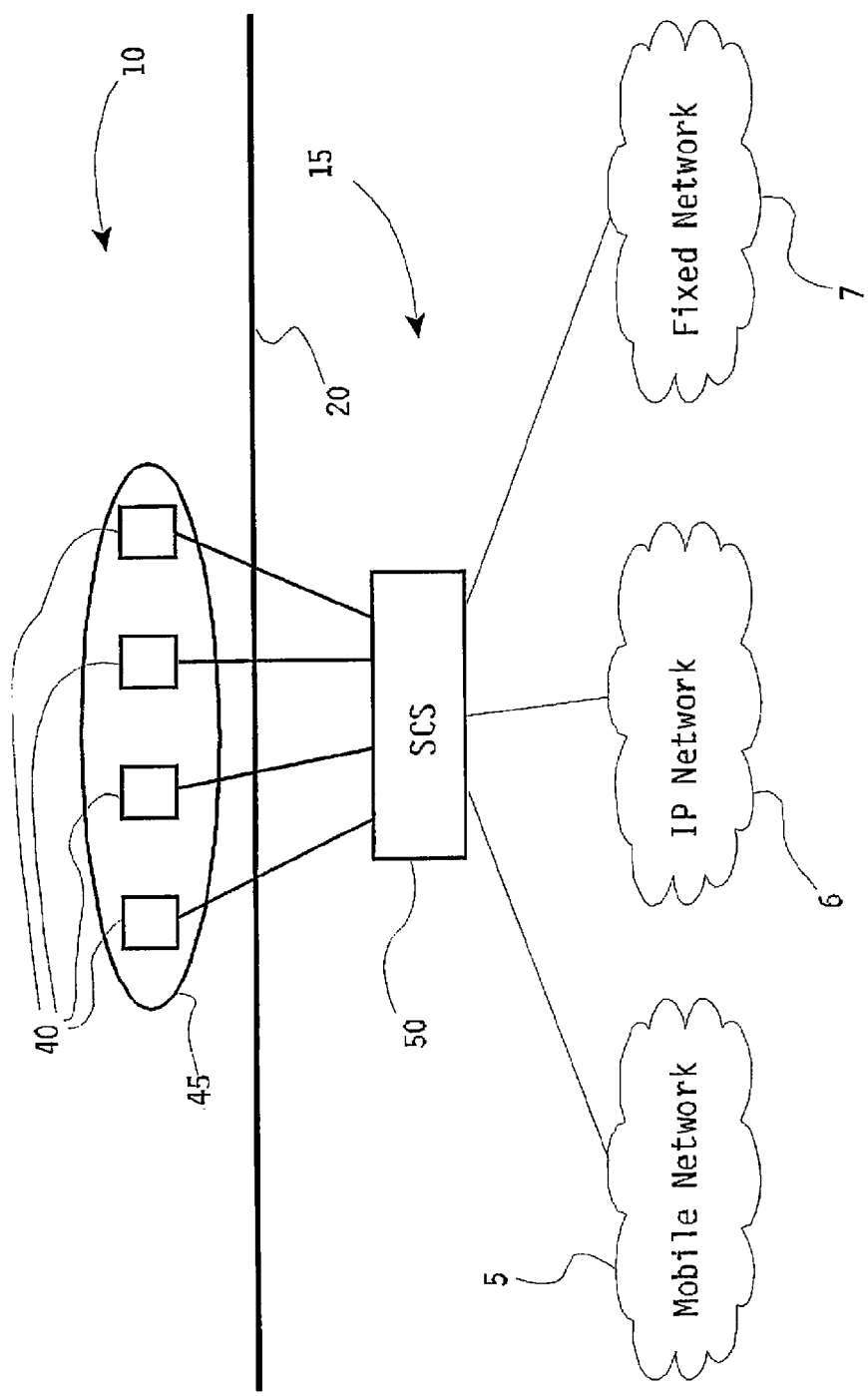
FIG. 1 illustrates a third generation logical network architecture.

Referring now to FIG. 1, the network architecture of third generation networks is based upon horizontal layering principles where applications are logically found in the upper layer 10, called the application or service network. The term service network is used to distinguish it from the core network 15 located in the lower layers. The service network 10 is based upon open distributed technology (JAVA, CORBA) and applications are able to access core network functionality by means of open and standardized application program interfaces (APIs).

Figure 2:
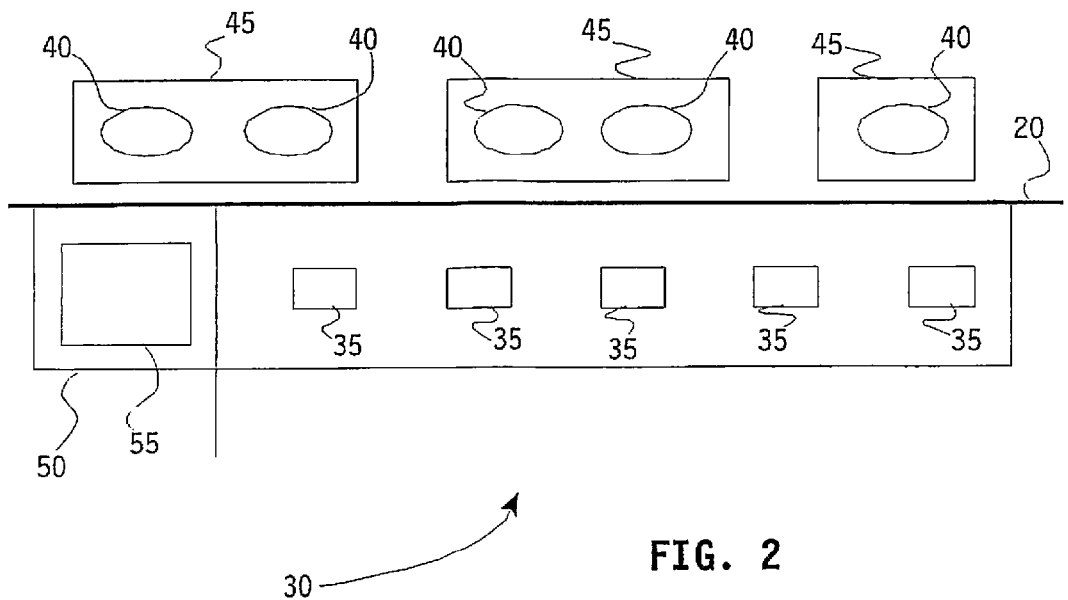
FIG. 2 illustrates an overview of the open service architecture.

In the layered architecture shown in FIG. 2, the open service architecture (OSA) comprises an application program interface between the service network 10 and the core network 15. While the invention is described with respect to the Open Service Architecture as defined by Parlay, 3GPP and ETSI. The invention is also applicable for webservice based approaches where the specific implementation details might be a bit different than in OSA. Applications 40 deployed on application servers 45 utilize service capability features that are provided by service capability servers (SCSs) 50. Service capability servers 50 are logical entities that implement the service capability features (SCFs) 35 and interact with the core network 15. The applications 40 and application servers 45 are located within the service network layer 10 as described previously. Thus, it can be seen that the open service architecture 30 acts as an API between the service network layer 10 and the core network layer 15.

Figure 3:
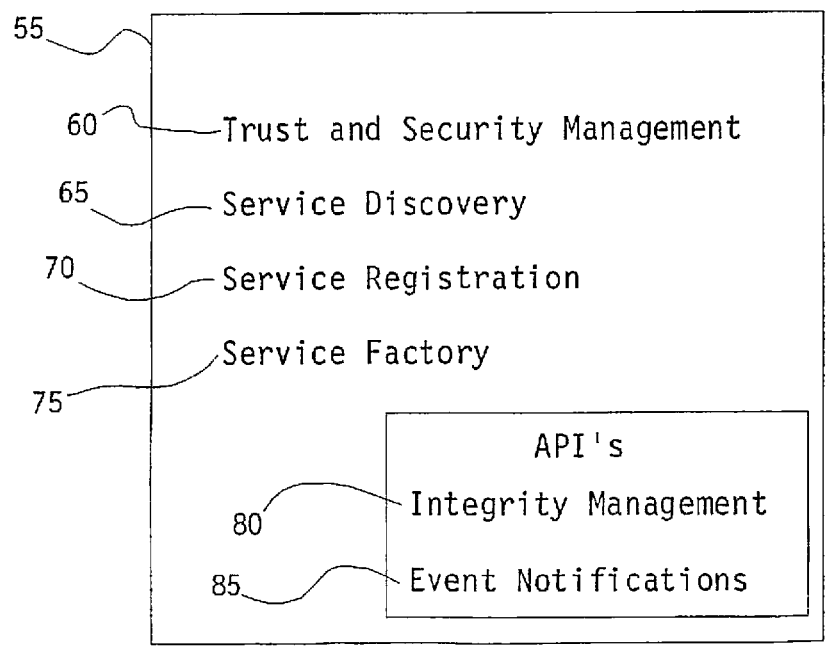
FIG. 3 illustrates various functionalities of the OSA framework.

The OSA Framework 55 is a registration and discovery server and enables the openness of the open system architecture and makes it possible to go beyond IN (Intelligent Networks) when it comes to openness, discovery and integration of new features as described below The OSA framework 55 also notifies applications of the addition of new service capability features within the open service architecture 30 The OSA framework 55 provides controlled access to the SCSs 50 which in combination with the distributed technology supports flexibility in application locations in business scenarios. Furthermore, it allows multi membership and even extension of the set of APIs As shown in FIG. 3, the OSA framework 55 is actually a family of service capability features 35 with the core portion consisting of Trust and Security Management 60 enabling the authentication of domain; Service Discovery 65 enabling the discovery of new SCF provided by the operator; Service Registration 70 providing for the registration of new SCFs to the framework; and Service Factory 75 enabling the creation of new SCF instances. Additionally, APIs are provided for Integrity Management 80 such as load balancing, fault management and heart beat and Event Notification 85 providing notifications for specific events.

Figure 4:
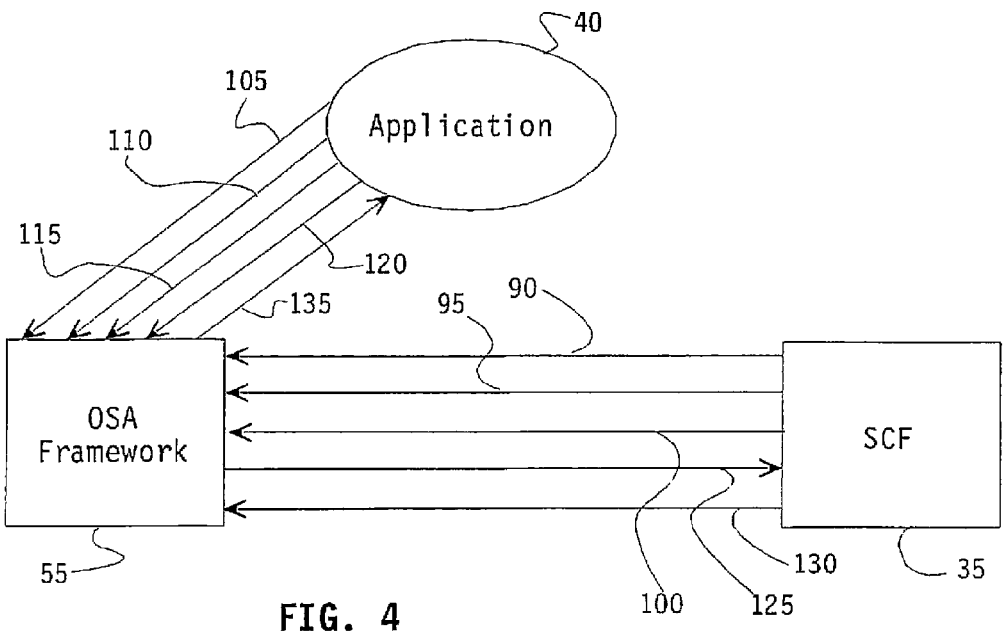
FIG. 4 illustrates a service registration by an application within the open service architecture.

Referring now to FIG. 4, there is illustrated the manner in which an application can start using an SCF 35 provided by a new Service Capability Server (SCS) 50. At a first stage, an SCS 50 will contact the OSA framework 55 and request an authentication and registration interface at steps 90 and 95. Next, the SCS 50 uses the registration interface to publish its capabilities and add a reference to its service factories at step 100 The factory pattern is a general design pattern and allows the OSA framework 55 to request the SCS 50 to create an SCF 35 interface At this moment, the OSA framework 55 and the SCS 50 know each other.

The application 40 contacts the OSA framework 55 and is authenticated at step 105. The application 40 requests at step 110 a discovery interface. The OSA framework 55 returns a reference or pointer to the discovery interface after which the application 40 uses this interface to request the type of SCF 35 and special capabilities needed by the application 40 at step 115. At this time, the OSA framework 55 tracks whether the application 40 is allowed to use the SCF 35 and under what conditions. This is captured in the service level agreement (SLA) between the network operator and the service provider. If the application is allowed to use the SCF 35, the OSA framework 55 returns all IDs of SCFs 35 that could fulfill the needs of the application.

Next, the application 40 selects at step 120 one of the SCFs 35 and signs the so-called Service Agreement. The OSA framework 55 contacts the service factory of the SCS 50 and forwards the conditions under which the application is allowed to use the SCFs 35 at step 125. The SCS 50 creates an SCF 35 instance that is to be used by this application and is also able to check the conditions at step 130, and the framework returns the reference or pointer to the application at step 135. From this point forward the application is authorized to use the SCF 35. While this described registration and discovery process enables the framework to inform an application of variously available SCFs 35 and via the notification interface the potential availability of a new SCS 50, there exists no mechanism for notifying an application of backward compatibility of a new SCF 35 with preexisting SCFs 35 Applications can use the event notification API on the framework 55 to subscribe to events. One example of an event is when a new SCF is made available.

Figure 5:
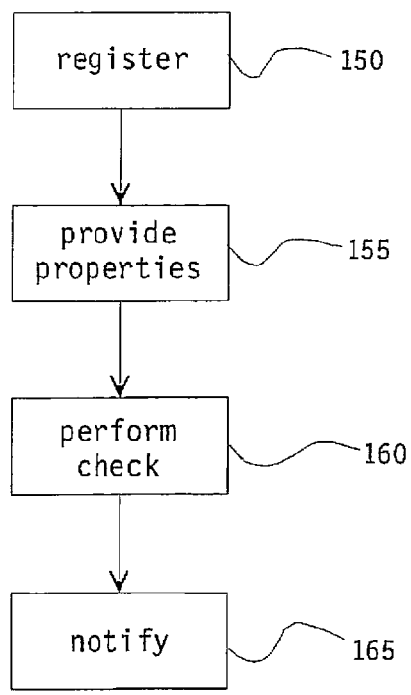
FIG. 5 is a flow diagram illustrating the method of the present invention for aiding applications migrating to a new SCF.

Referring now to FIG. 5, here is illustrated a method for determining backward compatibility for an SCF. When a new SCF is made available, the SCF must first register at step 150 with the OSA framework 55 as described previously with respect to FIG. 4. During this process, the SCF supplies the OSA framework 55 with the properties supported by this implementation of the SCF at step 155. The OSA framework 55 has information about each of the existing SCF implementations available within a specific network operator domain, information about the applications using them and the restrictions applying to the usage of the SCFs by the service level agreements Using this information the OSA frameworks is able to perform a check at step 160 of the properties of the new SCF implementation against previously existing versions. In this check, an indication is obtained as to what extent the new SCF implementation is backward compatible with other versions of SCFs used by the network. This information is forwarded at step 165 to the applications using previous versions of the SCF together with optional references to the interface of the new SCS. In order to provide references to the interfaces an extension of the current framework notification mechanism would be utilized. The framework notification mechanism can be guided by dedicated service properties that specify that the SCF implementation replaces or outdates a specified older SCF implementation or specify a migration strategy. The information about level of backward compatibility, the fact that the SCF implementation replaces or outdates an older SCF, migration strategy, etc. might be supplied either by the new SCS and sent to the application via the framework or by the framework after analyzing the properties of the new SCS when it registers or by both in conjunction.

By implementation of the this described extension, seamless migrations or applications between older and newer versions of SCF implementations can be enabled. This would allow an operator to outdate or update an SCF almost automatically. It would further allow an operator to take one SCF out of service for maintenance activities by directing the applications to a backup SCF.

The previous description is of a preferred embodiment for implementing the invention, and the scope of the invention should not necessarily be limited by this description The scope of the present invention is instead defined by the following claims.

What is claimed is:

1. A method of registering a new service within an Open Service Architecture (OSA) for allowing applications to migrate from using a previously registered service to a newly registering service, comprising the steps of:
   registering a second service with a registration and discovery server within a data communication network using said Open Service Architecture,
   supplying the OSA with properties of the second service supported by an implementation of Service Capability Feature (SCF), wherein the OSA includes information about the SCF implementation available within the data communication network, information about applications using the SCF implementation, and information about restrictions applying to usage of the SCF;
   based on the information, comparing SCF properties of the second service with SCF properties of a first service to determine if the second service is backward compatible to said first service wherein said first service is already registered with said registration and discovery server and being used by an application; and
   forwarding to said application, information concerning whether the second service is backward compatible to said first service thereby assisting said application to migrate from using said first service towards using said second service.

2. The method of claim 1, further comprising the step of providing the registration and discovery server with at least one SCF property supported by the second service.

3. The method of claim 1, wherein the step of forwarding further comprises the step of forwarding information concerning whether the second service is backward compatible to said first service to a plurality of applications using said first service.

4. The method of claim 1, wherein the step of forwarding further comprises the steps of forwarding pointers to at least one interface of a functional entity providing the service.

5. The method of claim 4, wherein the functional entity comprises a service capability server.

6. The method of claim 1, wherein the information specifies if the second service replaces the first service.

7. The method of claim 1, wherein the information specifies if the second service outdates the first service.

8. The method of claim 1, wherein the information specifies a migration strategy from the first service to said second service.

9. The method of claim 1, wherein the information is supplied by the second service.

10. The method of claim 1, wherein the information is supplied by the registration and discovery service.

11. The method of claim 1, further including the step of replacing the first service with the second service.

12. A method of registering a new service within an Open Service Architecture (OSA) for allowing applications to migrate from using a previously registered service to a newly registering service comprising the steps of:

registering a second service capability feature (second SCF) with an open service architecture framework;

providing the open service architecture framework with a Service Capability Feature (SCF) property supported by the second SCF, wherein the OSA includes information about the SCF implementation available within the data communication network, information about applications using the SCF implementation, and information about restrictions applying to usage of the SCF;

based on the information, comparing said SCF property of the second SCF with a SCF property of a first service capability feature (first SCF) to determine if the second SCF is backward compatible to said first SCF, wherein said first SCF is already registered with said open service architecture framework and being used by a plurality of applications; and forwarding to said plurality of applications, information concerning whether the second SCF is backward compatible to said first SCF thereby assisting said plurality of applications to migrate from using said first SCF towards using said second SCF.

13. The method of claim 12, wherein the step of forwarding further comprises the steps of forwarding pointers to at least one interface of a functional entity providing the service.

14. The method of claim 12, wherein the functional entity comprises a service capability server.

15. An open service architecture, comprising:

a service capability server providing a first service capability feature (first SCF) and a second service capability feature (second SCF); and an open service architecture framework configured to register the second SCF with the open service architecture framework, supply the OSA with properties of the second service SCF, wherein the OSA includes information about the second SCF implementation available within the data communication network, information about applications using the second SCF implementation, and information about restrictions applying to usage of the second SCF;

based on the information, compare SCF properties of the second SCF with SCF properties of the first SCF to determine if the second SCF is backward compatible to the first SCF wherein said first SCF is already registered with said open system architecture framework and being used by at least one application and forward to said at least one application using the first SCF, information concerning whether the second SCF is backward compatible to the first SCF thereby assisting the at least one application to migrate from using said first SCF to using said second SCF.

16. The open service architecture of claim 15, wherein the open service architecture framework is further configured to determine at least one SCF property supported by the second SCF.

17. The open service architecture of claim 15, wherein the open service architecture framework is further configured to forward information concerning whether the second SCF is backward compatible to the first SCF to a plurality of applications using the first SCF.

18. The open service architecture of claim 15, wherein the open service architecture framework is further configured to forward pointers to at least one interface of the service capability server providing the first SCF.

19. The open service architecture of claim 15, wherein the information specifies if the second SCF replaces the first SCF.

20. The open service architecture of claim 15, wherein the information specifies if the second SCF outdates the first SCF.

21. The open service architecture of claim 15, wherein the information specifies a migration strategy from the first SCF to said second SCF.

* * * * *